United States Patent [19]

Thiele

[11] 4,245,740
[45] Jan. 20, 1981

[54] CONTAINER FOR MAGNETIC TAPE CASSETTE

[75] Inventor: Hartmut Thiele, Munich, Fed. Rep. of Germany

[73] Assignee: AGFA-Gevaert, A.G., Leverkusen, Fed. Rep. of Germany

[21] Appl. No.: 60,383

[22] Filed: Jul. 25, 1979

[51] Int. Cl.³ .............................................. B65D 85/67
[52] U.S. Cl. .................................... 206/387; 206/493; 242/200
[58] Field of Search ............... 206/387, 493, 225, 408, 206/226, 475, 232, 472, 473; 242/200

[56] References Cited
U.S. PATENT DOCUMENTS

| 3,876,071 | 4/1975 | Neal et al. | 206/387 |
| 4,054,206 | 10/1977 | Kobayashi et al. | 206/387 |
| 4,078,657 | 3/1978 | Schurman | 206/387 |
| 4,153,178 | 5/1979 | Weavers | 206/387 |
| 4,184,594 | 1/1980 | Hehn | 206/387 |

Primary Examiner—Joseph Man-fu Moy
Attorney, Agent, or Firm—Connolly and Hutz

[57] ABSTRACT

Container for magnetic tape cassettes in particular for video cassettes in which the rolls of tape are protected against twisting by means of two hollow cylindrical bodies each comprising four guide elements with spring mounted arresting pins located at the bottom of the containers. When inserting the cassette into the container one of the pins of each hollow cylindrical body clicks into one of the drive holes of the hubs.

11 Claims, 5 Drawing Figures

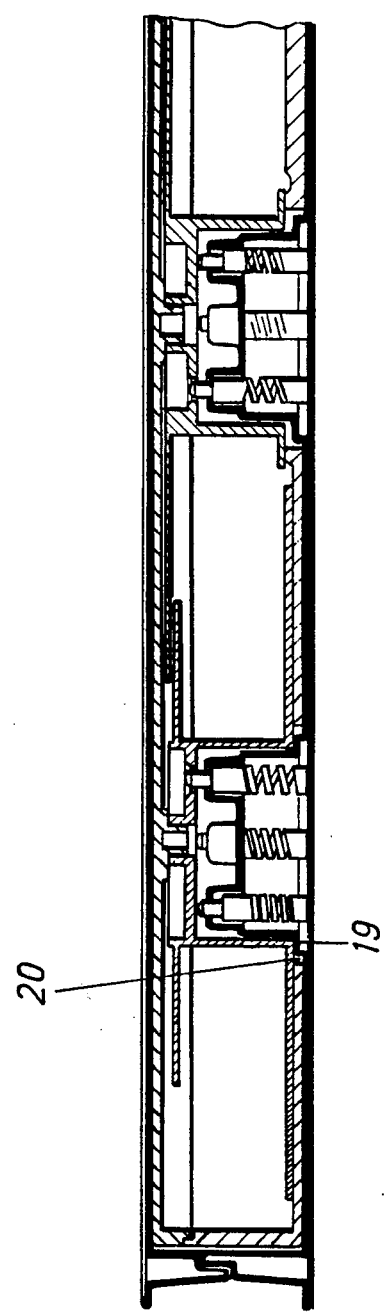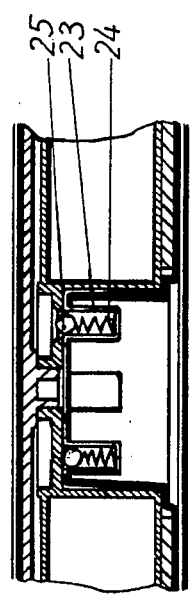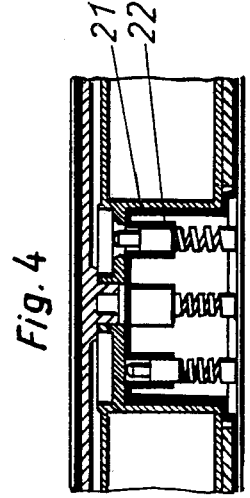

CONTAINER FOR MAGNETIC TAPE CASSETTE

The invention relates to containers for receiving and storing magnetic tape cassettes, in particular video cassettes, in which the rolls of tape are secured against twisting.

Magnetic tape cassettes with one or two rolls of magnetic tape are kept in separate containers for storage and transportation in order to protect the tapes from external harmful effects which can affect the quality of the audio, video or digital recordings. The rolls of tape which rest on hubs must therefore be prevented from slackening to form loops of tape. These loops of tape can cause trouble when the cassette is being transported or inserted into a playback apparatus or when the apparatus starts up. In order to overcome these difficulties, various cassette containers which arrest the hubs of the rolls of tape have already been proposed. In the case of compact cassettes, it is normal to use a case having projections moulded on its base which click into place when the cassette is inserted between the pins of the hub and thus secure the roll of tape against twisting. In other embodiments of recording tape cassettes, a spring acting as a socalled winding brake, presses onto the outermost winding of tape so that a comparable effect is achieved. As the spring also applies pressure when the cassette is running, the torque may be increased and this has an undersirable effect on the smooth running of the tape in the recorder.

A video cassette container with a self-locking device is described in U.S. Pat. No. 3,876,071. Two cylindrical knobs are provided in the bottom of the container and they each have on their surface a leaf spring with a locking button which engages in one of the drive holes in the tape hub. The button passes through one of the holes only when it is in alignment with it and thus secures the cassette against twisting. If none of the drive holes comes to rest above the locking button when the cassette is inserted into the container, the locking head is held down by the spring and only clicks into position when the tape hubs are rotated sufficiently far for the hole and button to be in alignment. A rotation of the roll of tape of up to 120° may be necessary for this to occur.

In British Pat. No. 1 536 792, two cylindrical knobs are provided for taking up the video cassette in the container, and also for self-locking, but, unlike those in the container just described, these knobs are not mounted rigidly but are mounted so as to be selfsprung. On their surface, they have three buttons which are offset by an angle of 120° and which are able to engage in drive holes in the tape hubs. The locking member consists of a squared off ring which is moulded on the bottom of the housing, behind which the flange of the knob engages, and of an internal hub which has a recess for a spring. When the drive holes of the tape cassette do not lie above the buttons, the locking members only press the cassette against the lid of the container so that the rolls of tape are however still freely rotatable. The tape hubs click into position only when the tape hubs are rotated, as soon as the buttons and holes are in alignment with each other. With this cassette, the roll of tape must also in the most undesirable case, turn through up to a maximum of 120° in order to obtain a positive engagement between the locking buttons and the hubs for the roll of tape.

An object of the invention is to develop a hub arrest which allows positive closure in any random position of drive holes, based on the fact that any rotation of the roll of tape in the cassette is disadvantageous. Another object of the invention is to provide a container for video cassettes with hub arrest, in which the housing and arresting cylinder are in one piece and which can therefore be produced economically.

According to the invention there is provided a container for receiving and storing a magnetic tape cassette with two tape winding hubs, each hub having a circular recess and a partition containing three drive holes arranged in a circle, the container comprising two hollow cylindrical bodies located inside the container each of which is provided for positively engaging in one of the recesses and at least four spring mounted arresting means located in and projecting form raised or countersunk guide elements arranged at equidistant intervals in a circle at the upper surface of each of the two cylindrical bodies such that when a cassette is inserted into the container, one of the arresting means of each of the two hollow cylindrical bodies engages one of the drive holes of each partition, the end portion of the arresting means which projects from the guide elements being rounded.

An advantage of the container according to the invention which is principally designed for taking up cassettes for 1.90 cm video tapes arises from the number of arresting means, which is larger than the number of drive holes through which they have to engage, and from the arrangement and design thereof. In contrast to the formerly known cassette containers, the tape hubs are arrested as soon as the cassette is inserted into the container, whereas, in the past, appart from the chance occurrence it was necessary to rotate the tape hubs by up to 120° for them to click into position.

With reference to the accompanying drawings:

FIG. 3 shows a longitudinal section of the container with a tape cassette inserted;

FIG. 4 shows a detail of the container in FIG. 3 with a hollow cylindrical body having countersunk guide elements;

FIG. 5 shows a detail corresponding to FIG. 4 with guide elements and arresting means designed as a unit.

Figure 1:
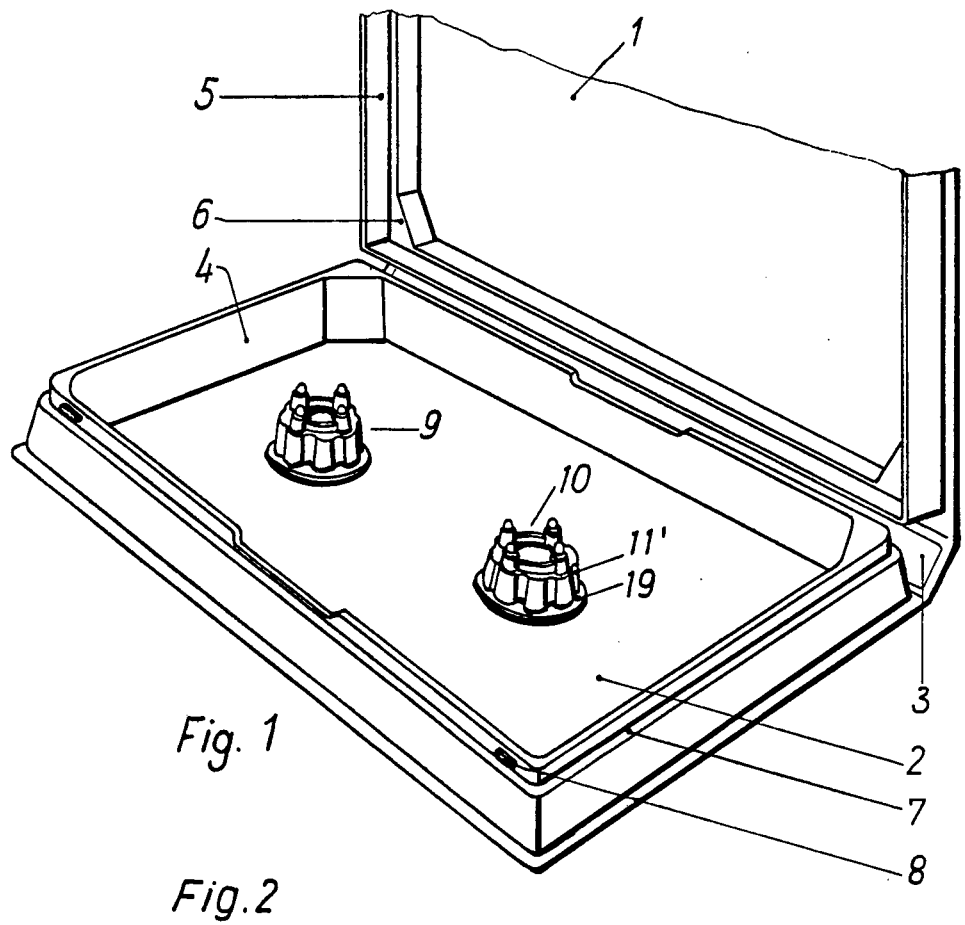
FIG. 1 shows a perspective view of the container according to the invention.

The figures, in particular FIG. 1, show a "booklike" closable container with a lid 1 and housing base 2, which are joined by means of a hinge 3.

Figure 2:
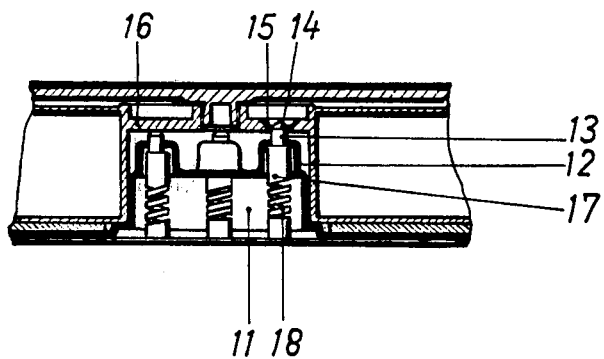
FIG. 2 shows a longitudinal section through an arresting member according to the invention.

The housing base is surrounded on all sides by lateral walls 4 which are shaped so as to hold a magnetic tape cassette in a close-fitting manner. The lid also has four lateral walls 5 which are designed congruently with those of the housing base. The lateral walls of the lid and base are staggered in the manner of steps (6 and 7 respectively), the edges of the lid wall 5 being staggered inwardly and those of the base wall 4 outwardly. This produces a labyrinth closure for the container which provides for dust-proof storage of the cassette. Ribs 8 can also be moulded on the front wall of the housing base as an additional means of holding the lid of the container closed. Two hollow cylindrical bodies 9, 10 are arranged in the housing base at a distance which is determined by the distance between the openings in the cassette housing. Moreover, as illustrated in FIGS. 1 and 2, each body comprises a hollow cylinder 11, the circumference of which fits in the circular recess of a tape winding hub and which can be provided with longitudinal beads 11'. In one embodiment, four guide elements 12 are arranged vertically on its surface equidistant from each other and at an angle of 90° with each other. In each guide element which is tubular in shape is located a spring mounted arresting pin 13 whose round shaped end 14 projects out of the support element to a sufficient extent so as to pass through one of the entrainment holes 15 in the tape hub 16 when engagement is positive. The spring mounted arresting pin preferably comprises a one-piece plastic member, namely a compact cylinder 17 and a spiral 18 moulded with it. The spiral spring can obviously also be placed on the cylindrical body in known manner by means of a stud (not illustrated) on the pin. The compact cylinder 17 of the pin which is guided in the guide element has the same diameter as the internal diameter of this element in each case. The free end of the guide element is slightly (about 1 mm) tapered and acts as a stop for the pin. The projecting part of the pin has a smaller diameter than the guided part, its end 14 being rounded off, for example in the shape of a dome. The pin is supported on the housing base by means of the spring. When the tape cassette is inserted into the container, the hub recesses are put over the arresting means. The drive holes in the partition of the hubs are arranged at 120° from each other. When using the arrangement according to the invention of four arresting pins which are rounded off in the shape of a dome (FIG. 3), one of the pins of each of the two hollow cylindrical bodies engages, directly and immediately when the cassette is inserted, into the holes in the tape winding hubs. Undesirable rotation of the roll of tape is thus substantially prevented. A narrow flange 19 which corresponds in size to the dimensions of opening 20 (FIG. 3) in the cassette base can be moulded on the foot of the hollow cylindrical body in order to increase the stability of the arresting means. The container of the invention may be produced by deep drawing the lid and housing and by subsequently welding them on to the cover once the arresting pins have been inserted.

FIG. 4 shows another embodiment of the invention. The essential difference between this embodiment and that previously described lies in the fact that the rigid hollow cylindrical bodies 21 completely fill the recesses in the tape hubs, i.e. their height corresponds to the distance between cassette base and hub partition. The surface of the hollow cylinder contains four openings with guide elements 22 which are in this case countersunk. The arresting pins themselves can be designed in a similar manner to that shown in the first embodiment. The guide elements together with the arresting pins can also be composed of one unit. A member of this type comprises a flanged tube 23, as shown in FIG. 5, in which the countersunk passage receives a spiral spring 24 and superimposed ball 25. The ball is pressed against a collar of the tube. An arresting mean which is designed in this way can also be inserted into the hollow cylinder from above.

What We claim is:

1. Container for receiving and storing a magnetic tape cassette with two tape winding hubs, each hub having a circular recess and a partition containing three drive holes arranged in a circle, the container comprising two hollow cylindrical bodies located inside the container each of which is provided for positively engaging in one of the recesses and at least four spring mounted arresting means located in and projecting from raised or countersunk guide elements arranged at equidistant intervals in a circle at the upper surface of each of the two cylindrical bodies such that when a cassette is inserted into the container, one of the arresting means of each of the two hollow cylindrical bodies engages one of the drive holes of each partition, the end portion of the arresting means which projects form the guide elements being rounded.

2. Container according to claim 1, wherein the height of the hollow cylindrical bodies with raised guide elements corresponds to the distance between the cassette base and hub partition.

3. Container according to claim 1, wherein the height of the hollow cylindrical bodies corresponds to the distance between the cassette base and hub partition when guide elements are countersunk.

4. Container according to any of claim 1 to 3, wherein the ends of the arresting means projecting from the guide elements are dome shaped.

5. Container according to any of claim 1 to 3, wherein each of the spring mounted arresting means is formed in one piece.

6. Container according to any of claims 1 to 3, wherein the portion of the arresting means which projects from the guide elements has a smaller diameter than the portion located inside the guide elements, the latter portion having a diameter which corresponds to the internal diameter of the guide element.

7. Container according to any of claims 1 to 3, wherein the arresting means are supported on the base of the container.

8. Container according to any of claims 1 to 3, wherein the arresting means comprise a pin.

9. Container according to any of claims 1 to 3, wherein the countersunk guide element and the spring mounted arresting means form a unit comprising a flanged tube containing a spiral spring, a ball resting on the spring and on a collar of the tube.

10. Container according to any of claims 1 to 3, wherein the lateral walls of the hollow cylindrical bodies have a plurality of longitudinal beads.

11. Container according to any of claims 1-3, wherein a narrow flange whose diameter corresponds to the opening in the base of the cassette is moulded on the foot of the hollow cylindrical bodies.

* * * * *